(12) United States Patent
Chyang

(10) Patent No.: US 7,374,604 B2
(45) Date of Patent: May 20, 2008

(54) SYSTEM AND METHOD FOR FLUE GAS TREATMENT

(75) Inventor: Chien-Song Chyang, Jhongli (TW)

(73) Assignee: Chung Yuan Christian University, Chung-Li (TW)

( * ) Notice: Subject to any disclaimer, the term of this patent is extended or adjusted under 35 U.S.C. 154(b) by 412 days.

(21) Appl. No.: 11/006,160

(22) Filed: Dec. 7, 2004

(65) Prior Publication Data

US 2005/0271567 A1 Dec. 8, 2005

(30) Foreign Application Priority Data

Jun. 3, 2004 (TW) .............................. 93115906 A

(51) Int. Cl.
*B01D 50/00* (2006.01)
*B01D 47/00* (2006.01)
*B01D 21/24* (2006.01)
*B01D 53/34* (2006.01)
*C01B 17/00* (2006.01)
*C21B 7/22* (2006.01)
*C23C 16/00* (2006.01)

(52) U.S. Cl. ..................... 96/234; 95/10; 95/14; 95/16; 95/23; 95/195; 95/196; 95/197; 95/198; 95/199; 95/200; 95/223; 95/224; 96/236; 96/237; 96/238; 96/239; 96/240; 96/271; 96/272; 96/273

(58) Field of Classification Search .......... 96/234–240, 96/244, 251–252, 271–273, 361–364; 95/10, 95/14, 16, 23, 195–200, 223–224

See application file for complete search history.

(56) References Cited

U.S. PATENT DOCUMENTS

| | | | | |
|---|---|---|---|---|
| 3,695,004 A | * | 10/1972 | DeLisio et al. | 96/251 |
| 3,911,084 A | * | 10/1975 | Wall et al. | 423/243.11 |
| 3,959,139 A | * | 5/1976 | El-Hindi | 210/97 |
| 4,330,511 A | * | 5/1982 | Nelson et al. | 423/210 |
| 4,364,750 A | * | 12/1982 | Koncz | 95/197 |
| 5,599,508 A | * | 2/1997 | Martinelli et al. | 422/169 |
| 5,851,293 A | * | 12/1998 | Lane et al. | 118/715 |
| 5,955,037 A | * | 9/1999 | Holst et al. | 422/171 |
| 6,068,688 A | * | 5/2000 | Whitehouse et al. | 106/31.65 |
| 6,926,756 B1 | * | 8/2005 | Yuan et al. | 95/19 |

\* cited by examiner

*Primary Examiner*—Duane Smith
*Assistant Examiner*—Ives Wu
(74) *Attorney, Agent, or Firm*—Rosenberg, Klein & Lee

(57) ABSTRACT

The present invention discloses a system for flue gas treatment, wherein the provided system comprises a quench module, a first control module, a filter collecting module, a wet scribing module and a regeneration module. In this system, parts of the particles contained in flue gas are removed in the quench module and the wet scribing module by a first scrubbing solution, and then in wet scribing module a second scrubbing liquid containing particles is formed. Next, the second scrubbing solution is treated in the regeneration module to form a third scrubbing solution, wherein the third scrubbing solution is then fed back to the quench module and/or the wet scrubbing module to substitute the first scrubbing solution for repeating what originally performed via the first scrubbing solution. Furthermore, this invention discloses a method for flue gas treatment.

3 Claims, 3 Drawing Sheets

SYSTEM AND METHOD FOR FLUE GAS TREATMENT

CROSS-REFERENCE TO RELATED APPLICATIONS

This application claims priority under the Paris Convention to Taiwan application No. 093115906 filed on Jun. 3, 2004.

BACKGROUND OF THE INVENTION

1. Field of the Invention

The present invention is generally related to flue gas treatment, and more particularly to flue gas treatment utilizing a recovery scrubbing solution.

2. Description of the Prior Art

Incineration is one of the best methods of reducing the volume and hazard of organic hazardous wastes. Through incineration, more than 90 percent of the volume of the original waste is typically reduced. However, there is no 100 percent efficient process, including incineration. Products of Incomplete Combustion (PICs) may be formed at trace concentrations during incinerations of both hazardous and nonhazardous wastes. PICs are organic compounds which are formed during partial combustion due to incomplete mixing, insufficient time, or insufficiently high temperatures, and are not completely destroyed. In operation, PICs and other byproduct of incineration should be removed by the air pollution control equipment to avoid secondary pollution for environment. However, to improve the process as a whole, the amounts of PICs should be decreased by improving the incineration efficiency, but not to depend on post air pollution control treatment.

Wet scrubber, dry sorbent injection and semi-dry sorbent injection are current common air pollution control equipments, wherein wet scrubber is more preferable for its much lower price. Nevertheless, for the wet scrubber, waste scrubbing water treatment is a big issue. Currently, a commercial solution is that wastewater treatment plant supports incineration in a comprehensive waste management system. Combustible constituents are burned at incinerators; soluble constituents and suspended particulates in wastewater are treated at wastewater treatment plants, so as to meet the National Effluent Standard. Therefore, a new system for flue gas treatment is still needed corresponding to both economic effect and utilization in industry.

SUMMARY OF THE INVENTION

In accordance with the present invention, new system and method for flue gas treatment are provided. These system and method can meet the requirement of low cost and high operation efficiency.

One object of the present invention is to employ a recovery scrubbing solution in a scrubbing tower, incinerating apparatus, or cooling apparatus (for example: a quench tower), so as to reduce the amount of waste water and to supply cooling water as well. Moreover, with only a few modifications this invention can be applied to the present small and medium capacity incinerators. Therefore, this present invention does have the economic advantages for industrial applications.

Accordingly, the present invention discloses a system for flue gas treatment, wherein the provided system comprises a quench module, a first control module, a filter collecting module, a wet scribing module and a regeneration module.

In this system, parts of the particles contained in flue gas are removed in the quench module and the wet scribing module by a first scrubbing solution, and then in wet scribing module a second scrubbing liquid containing particles is formed. Next, the second scrubbing solution is treated in the regeneration module to form a third scrubbing solution, wherein the third scrubbing solution is then fed back to the quench module and/or the wet scrubbing module to substitute the first scrubbing solution for repeating what originally performed via the first scrubbing solution. Furthermore, this invention discloses a method for flue gas treatment.

DESCRIPTION OF THE PREFERRED EMBODIMENTS

Figure 1:
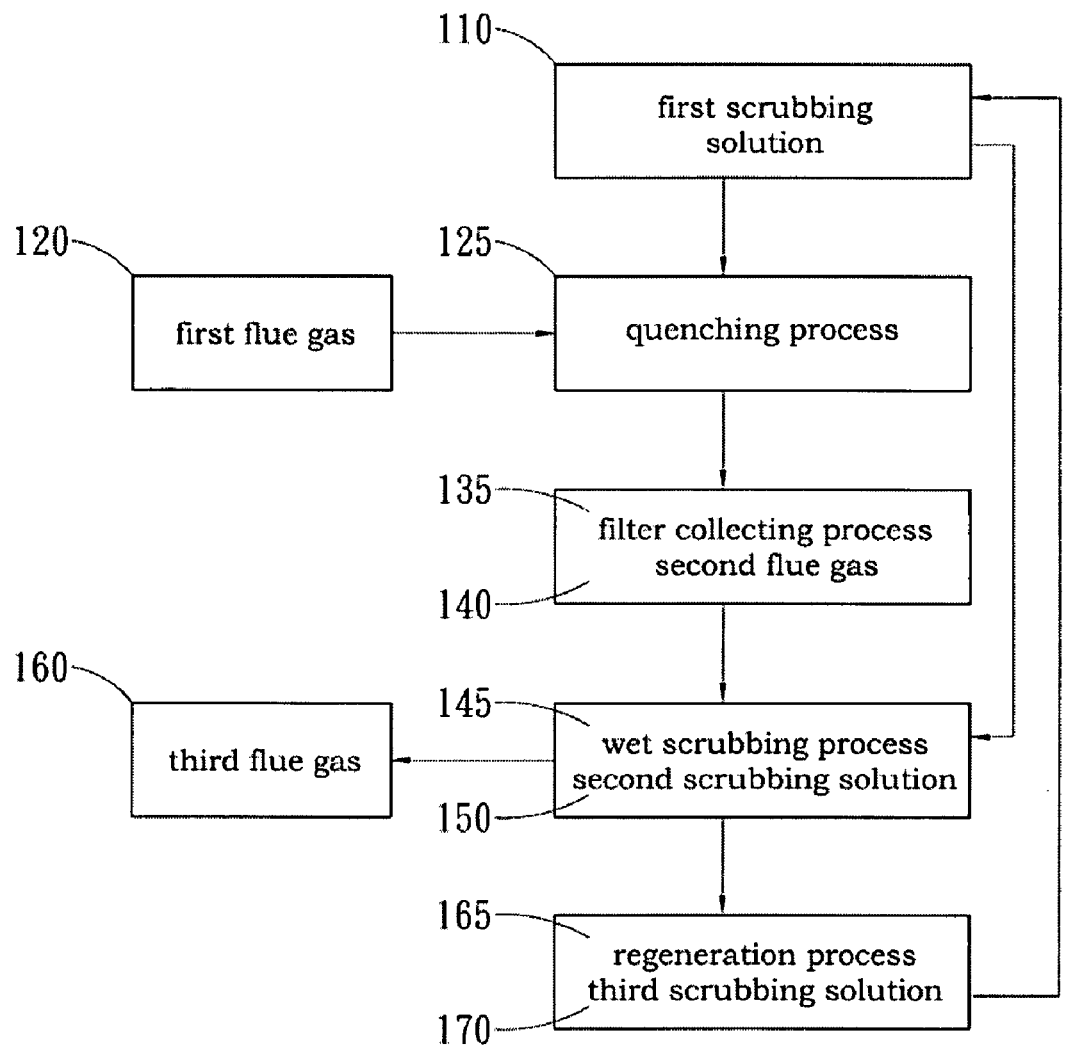
FIG. 1 is a flow chart of a method for flue gas treatment in accordance with a first embodiment of the present invention.
Figure 2:
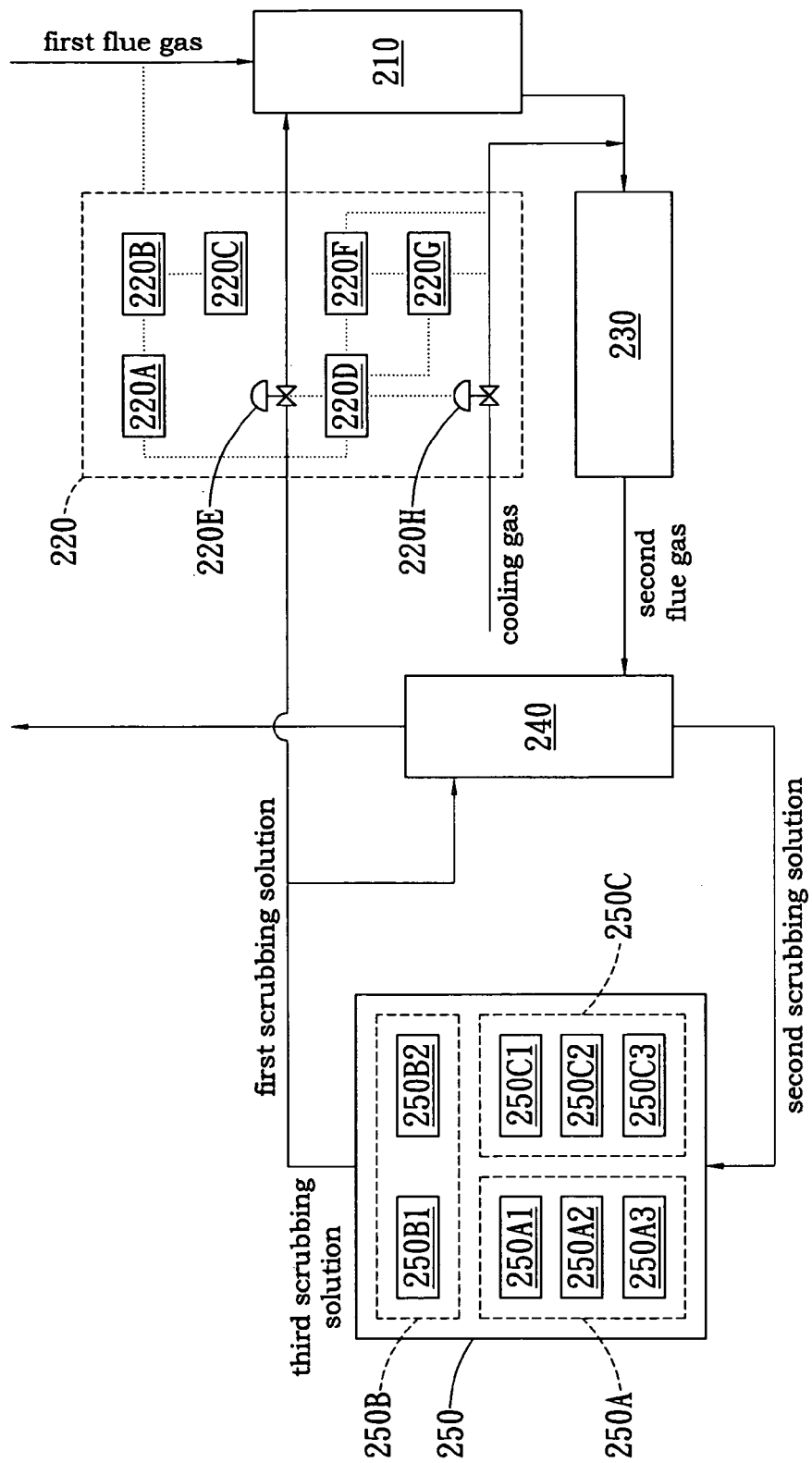
FIG. 2 is a schematic diagram illustrating a system for flue gas treatment in accordance with a second embodiment of the present invention.
Figure 3:
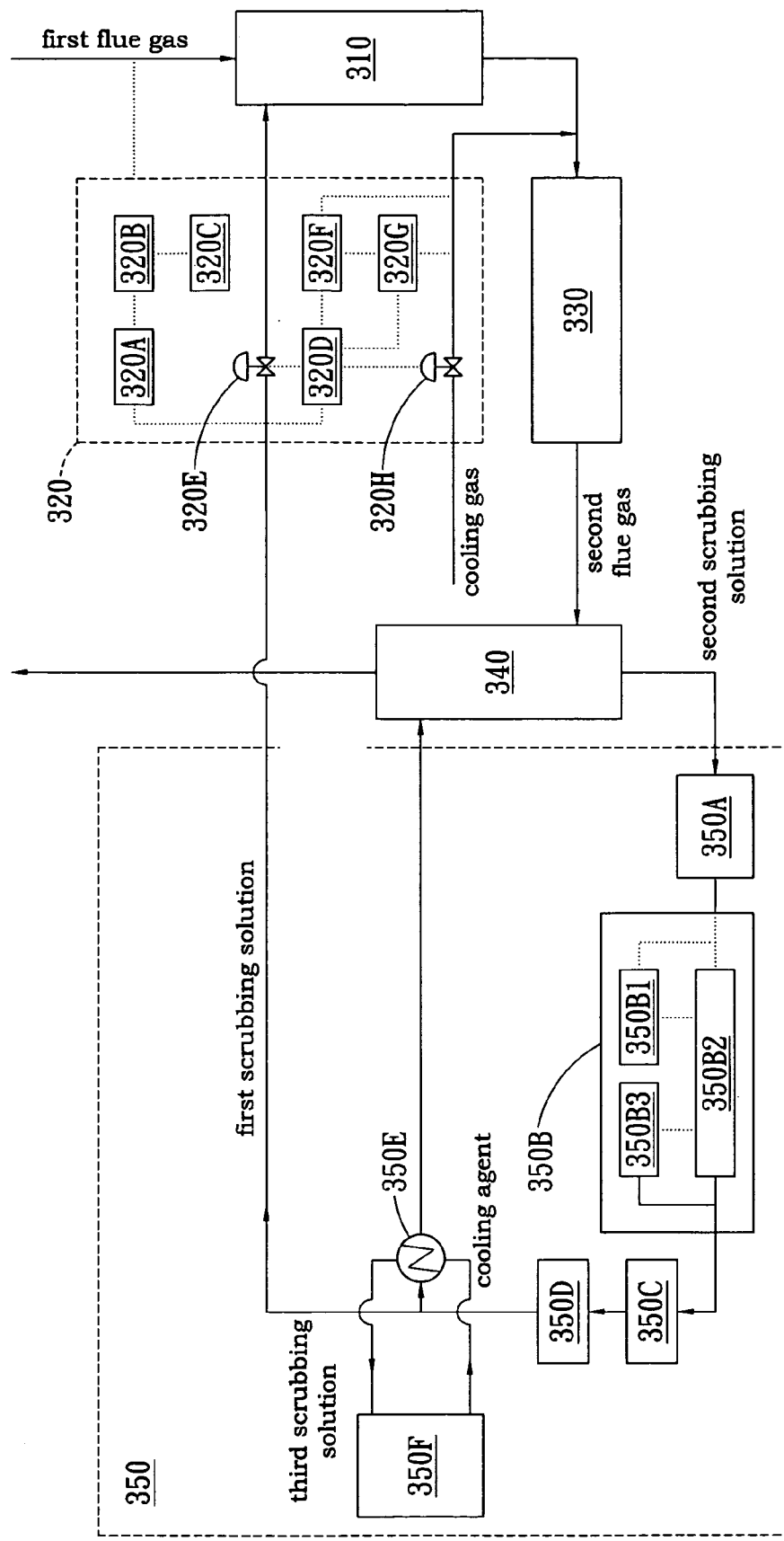
FIG. 3 is a schematic diagram illustrating a system for flue gas treatment in accordance with a third embodiment of the present invention.

What is probed into the invention is system and method for flue gas treatment. Detailed descriptions of the production, structure and elements will be provided in the following in order to make the invention thoroughly understood. Obviously, the application of the invention is not confined to specific details familiar to those who are skilled in flue gas treatment. On the other hand, the common elements and procedures that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

In a first embodiment of the present invention, a method for flue gas treatment is provided. First of all, performing a quenching process 125 by a first scrubbing solution 110 to decrease the temperature of a first flue gas 120 to a first temperature, and to remove a plurality of first flue gas particles with a first diameter from the first flue gas 120, wherein the first temperature ranges from 150□ to 190□, and the first diameter is larger than 50 μm. Next, performing a filter collecting process 135 to remove a plurality of second flue gas particles with a second diameter from the first flue gas 120 with the first temperature, through which to form a second flue gas 140 with the first temperature, wherein the filter collecting process 135 further comprises a fabric filtering process, the second diameter is larger than 30 μm, and the second temperature ranges from 40□ to 60□. Afterwards, performing a wet scrubbing process 145 by the first scrubbing solution 110 to decrease the first temperature of the second flue gas 140 to a second temperature, and to remove a plurality of third flue gas particles with a third diameter, larger than 10 μm, from the second flue gas 140, whereupon a second scrubbing solution 150 is formed from the first scrubbing solution 110, and then a third flue gas 160 is formed. After the wet scrubbing process 145, performing a regeneration process 165 to treat the second scrubbing solution 140 to form a third scrubbing solution 170. Finally, feeding the third scrubbing solution 170 back to substitute the second scrubbing solution 150 for repeating the quenching process 125 and the wet scrubbing process 145 which are originally performed via the first scrubbing solution 110. If the first and second flue gases 120, 140 contain acid matter, the wet scrubbing process 145 is performed to remove the acid matter. On the other hand, the above-mentioned quenching process 125 further comprises a dilution step to assist in decreasing the temperature of the first flue gas 120 to the first temperature, in an effort to reduce the amount of the second scrubbing solution 150 produced.

In this embodiment, the regeneration process 165 further comprises a particle-removing process and a cooling process, wherein the particle-removing process is performed to remove a plurality of particles contained in the second scrubbing solution 150, through which to fabricate the third scrubbing solution 170 with a third temperature. In detail, the particle-removing process further comprises performing a gravity settling step to remove a plurality of fist scrubbing solution particles with a fourth diameter, larger than 10 µm, from the second scrubbing solution 150; utilizing centrifugal force to remove a plurality of second scrubbing solution particles with a fifth diameter, larger than 10 µm, from the second scrubbing solution 150; and performing a screen step to remove a plurality of third scrubbing solution particles with a sixth diameter, larger than 5 µm, from the second scrubbing solution 150. Next, the cooling process is performed to decrease the third temperature of the third scrubbing solution 170 to a fourth temperature, through which the third scrubbing solution 170 with the fourth temperature is formed, wherein the fourth temperature is lower than 40☐. Moreover, the third scrubbing solution 170 with the third temperature is applicable in the quenching process 125, and the third scrubbing solution 170 with the fourth temperature is applicable in both the wet scrubbing process 145 and the quenching process 125. On the other hand, if the second scrubbing solution 150 contains acid matter, the regeneration process 165 further comprises a neutralization step to neutralize the acid matter, so as to fabricate the third scrubbing solution 170 with a specific pH value ranging from pH7 to pH9.

In a second embodiment of the present invention, there is provided a system for flue gas treatment, which comprises a quench module 210, a first control module 220 for adjusting the flow rate of the first scrubbing solution 110 into the quench module 210, a filter collecting module 230, a wet scrubbing module 240 and a regeneration module. In detail, the quench module 210 is used to receive a first flue gas 120, decrease the temperature of the first flue gas 120 to a first temperature via a first scrubbing solution 110, and remove a plurality of first flue gas particles with a first diameter from the first flue gas 120 Next, the filter collecting module 230 is used to remove a plurality of second flue gas particles with a second diameter from the first flue gas 120 with the first temperature, whereupon a second flue gas 140 with the first temperature is formed, and the filter collecting module further comprises a fabric filter. Furthermore, the wet scrubbing module 240 is used to decrease the first temperature of the second flue gas 140 to a second temperature via the first scrubbing solution 110, and to remove a plurality of third flue gas particles with a third diameter from the second flue gas 140, whereupon a second scrubbing solution 150 is formed. Finally, the regeneration module 250 is used to treat the second scrubbing solution 150 to form a third scrubbing solution 170, wherein the third scrubbing solution 170 is then fed back to the quench module 210 and the wet scrubbing module 240 to substitute the first scrubbing solution 110 for repeating what originally performed via the first scrubbing solution 110.

In this embodiment, the first control module 220 further comprises: a first flow rate detecting device 220A to detect the flow rate of said first flue gas and generate a first flow rate signal; a first humidity detecting device 220B to detect the humidity of said first flue gas and generate a first humidity signal; a first temperature detecting 220C device to detect the temperature of said first flue gas and generate a first temperature signal; a central processing device 220D to receive said first flow rate signal, said first humidity signal and said first temperature signal, and to generate an instant first control signal; and a first control valve 220E to receive said first control signal, lead said first scrubbing solution 110 into said quench module 210 and adjust the amount of said first scrubbing solution 110. Furthermore, said first control module 220 further comprises a dilution apparatus to assist in decreasing the temperature of said first flue gas 120 and reduce the amount of said second scrubbing solution produced 150. Additionally, said dilution apparatus further comprises: a second humidity detecting device 220F to detect the humidity of a cooling gas and generate a second humidity signal; a second temperature detecting device 220G to detect the temperature of said cooling gas and generate a second temperature signal; said first central processing device 220D to receive said second humidity signal and said second temperature signal, and combine with said first flow rate signal, said first humidity signal and said first temperature signal, to generate an instant second control signal; and a second control valve 220H to receive said second control signal, lead said cooling gas into said filter collecting module 230 and adjust the amount of said cooling gas.

In this embodiment, the regeneration module 250 further comprises a particle-removing apparatus 250A and a cooling apparatus 250B, wherein the particle-removing apparatus 250A is used to remove a plurality of particles contained in said second scrubbing solution 150, through which to fabricate said third scrubbing solution 170 with a third temperature. In detail, the particle-removing apparatus 250A further comprises a gravity settling tank 250A1, a hydrocyclone 250A2 and a screen 250A3, wherein the gravity settling tank 250A1 is used to remove a plurality of fist scrubbing solution particles with a fourth diameter from said second scrubbing solution 150. Next, a hydraulic cyclone 250A2 is used to remove a plurality of second scrubbing solution particles with a fifth diameter from said second scrubbing solution 150 by utilizing centrifugal force. Moreover, a screen 250A3 to remove a plurality of third scrubbing solution particles with a sixth diameter from said second scrubbing solution 150. On the other hand, the cooling apparatus 250B is used to decrease said third temperature of said third scrubbing solution 170 to a fourth temperature, through which said third scrubbing solution 170 with said fourth temperature is formed. The cooling apparatus 250B further comprises a heat exchanger 250B1 and a cooling tower 250B2, wherein the heat exchanger 250B1 is used to decrease said third temperature of said third scrubbing solution 170 to said fourth temperature by use of a cooling agent with a fifth temperature, in the mean time said fifth temperature of said cooling agent is increased to a sixth temperature. Next, the cooling tower 250B2 is used to decrease said sixth temperature of said cooling agent to said fifth temperature, and feed back said cooling agent with said fifth temperature to said heat exchanger 250*b*1 for repeating use. Besides, if the second scrubbing solution 150 contains acid matter, the regeneration module 250 further comprises a neutralization apparatus 250C to neutralize the acid matter, wherein the neutralization apparatus 250C comprises: a pH value detector 250C1 to detect the pH value of said second scrubbing solution 150 and generate a pH value signal; a second central processing device 250C2 to receive said pH value signal and generate an instant third control signal; and at least one chemical agent tanks 250C3 to receive said third control signal and provide said chemical agent to adjust said pH value of said second scrubbing solution 150.

In a third embodiment of the present invention, there is provided a system for flue gas treatment, which comprises: a quench tower 310 to receive a first flue gas, decrease the temperature of said first flue gas to a first temperature via a first scrubbing solution, and remove a plurality of first flue gas particles with a first diameter from said first flue gas; a fabric filter 330 to remove a plurality of second flue gas particles with a second diameter from said first flue gas with said first temperature, whereupon a second flue gas with said first temperature is formed; a first control module 320 comprising a first flow rate detecting device 320A to detect the flow rate of said first flue gas, a first humidity detecting device 320B to detect the humidity of said first flue gas, a first temperature detecting device 320C to detect the temperature of said first flue gas, a central processing device 320D, a first control valve 320E, a second humidity detecting device 320F to detect the humidity of a cooling gas, a second temperature detecting device 320G to detect the temperature of said cooling gas and a second control valve 320H, wherein said first central processing device 320D receives a first flow rate signal generated from said first flow rate detecting device 320A, a first humidity signal generated from said first humidity detecting device 320B, a first temperature signal generated from said first temperature detecting device 320C, a second humidity signal generated from said second humidity detecting device 320F and a second temperature signal generated from said second temperature detecting device 320G, and generates an instant first and second control signals, whereupon said first control valve 320E receives said first control signal to lead said first scrubbing solution 110 into said quench tower 310 and adjust the amount of said first scrubbing solution 110, and said second control valve 320H receives said second control signal to lead said cooling gas into said fabric filter 330 and adjust the amount of said cooling gas; a wet scrubbing tower 340 to decrease said first temperature of said second flue gas 140 to a second temperature via said first scrubbing solution 110, and to remove a plurality of third flue gas particles with a third diameter from said second flue gas 140, whereupon a second scrubbing solution 150 is formed; and a regeneration module 350 to treat said second scrubbing solution 150 to form a third scrubbing solution 170, wherein said third scrubbing solution 170 is then fed back to said quench tower 310 and said wet scrubbing tower 340 to substitute said first scrubbing solution 110 for repeating what originally performed via said first scrubbing solution 110.

In this embodiment, the regeneration module 350 further comprises: a gravity settling tank 350A to remove a plurality of fist scrubbing solution particles with a fourth diameter from said second scrubbing solution 150; a neutralization apparatus 350B to neutralize the acid matter contained in said second scrubbing solution 150; a hydrocyclone 350C to remove a plurality of second scrubbing solution particles with a fifth diameter from said second scrubbing solution 150 by utilizing centrifugal force; a screen 350D to remove a plurality of third scrubbing solution particles with a sixth diameter from said second scrubbing solution 150; a heat exchanger 350E to decrease said third temperature of said third scrubbing solution to said fourth temperature by use of a cooling agent with a fifth temperature, in the mean time said fifth temperature of said cooling agent is increased to a sixth temperature; a cooling tower 350F to decrease said sixth temperature of said cooling agent to said fifth temperature, and feed back said cooling agent with said fifth temperature to said heat exchanger 350E for repeating use. On the other hand, said neutralization apparatus 350B further comprises: a pH value detector 350B1 to detect the pH value of said second scrubbing solution and generate a pH value signal; a second central processing device 350B2 to receive said pH value signal and generate an instant third control signal; and at least one chemical agent tanks 350B3 to receive said third control signal and provide said chemical agent to adjust said pH value of said second scrubbing solution 150.

In the above preferred embodiments, the present invention employs a recovery scrubbing solution in a scrubbing tower, incinerating apparatus, or cooling apparatus (for example: a quench tower), so as to reduce the amount of waste water and to supply cooling water as well. Moreover, with only a few modifications this invention can be applied to the present small and medium capacity incinerators. Therefore, this present invention does have the economic advantages for industrial applications.

To sum up, the present invention discloses a system for flue gas treatment, wherein the provided system comprises a quench module, a first control module, a filter collecting module, a wet scribing module and a regeneration module. In this system, parts of the particles contained in flue gas are removed in the quench module and the wet scribing module by a first scrubbing solution, and then in wet scribing module a second scrubbing liquid containing particles is formed. Next, the second scrubbing solution is treated in the regeneration module to form a third scrubbing solution, wherein the third scrubbing solution is then fed back to the quench module and/or the wet scrubbing module to substitute the first scrubbing solution for repeating what originally performed via the first scrubbing solution. Furthermore, this invention discloses a method for flue gas treatment.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. a system for flue gas treatment, comprising:
   a quench tower to receive a first flue gas, decrease the temperature of said first flue gas to a first temperature via a first scrubbing solution, and remove a plurality of first flue gas particles with a first diameter from said first flue gas;
   a fabric filter to remove a plurality of second flue gas particles with a second diameter from said first flue gas with said first temperature, whereupon a second flue gas with said first temperature is formed;
   a first control module comprising a first flow rate detecting device to detect the flow rate of said first flue gas, a first humidity detecting device to detect the humidity of said first flue gas, a first temperature detecting device to detect the temperature of said first flue gas, a central processing device, a first control valve, a second humidity detecting device to detect the humidity of a cooling gas, a second temperature detecting device to detect the temperature of said cooling gas and a second control valve, wherein said first central processing device receives a first flow rate signal generated from said first flow rate detecting device, a first humidity signal generated from said first humidity detecting device, a first temperature signal generated from said first temperature detecting device, a second humidity signal generated from said second humidity detecting device and a second temperature signal generated from said second temperature detecting device, and generates an instant first and second control signals, whereupon said first control valve receives said first control signal to lead said first scrubbing solution into said quench tower and adjust the amount of said first scrubbing solution, and said second control valve receives said second control signal to lead said cooling gas into said fabric filter and adjust the amount of said cooling gas;

a wet scrubbing tower to decrease said first temperature of said second flue gas to a second temperature via said first scrubbing solution, and to remove a plurality of third flue gas particles with a third diameter from said second flue gas, whereupon a second scrubbing solution is formed; and a regeneration module to treat said second scrubbing solution to form a third scrubbing solution, wherein said third scrubbing solution is then fed back to said quench tower and said wet scrubbing tower to substitute said first scrubbing solution for repeating what originally performed via said first scrubbing solution.

2. the system in claim 1, wherein said regeneration module further comprises:

a gravity settling tank to remove a plurality of fist scrubbing solution particles with a fourth diameter from said second scrubbing solution;

a neutralization apparatus to neutralize the acid matter contained in said second scrubbing solution;

a hydrocyclone to remove a plurality of second scrubbing solution particles with a fifth diameter from said second scrubbing solution by utilizing centrifugal force;

a screen to remove a plurality of third scrubbing solution particles with a sixth diameter from said second scrubbing solution;

a heat exchanger to decrease said third temperature of said third scrubbing solution to said fourth temperature by use of a cooling agent with a fifth temperature, in the mean time said fifth temperature of said cooling agent is increased to a sixth temperature; and a cooling tower to decrease said sixth temperature of said cooling agent to said fifth temperature, and feed back said cooling agent with said fifth temperature to said heat exchanger for repeating use.

3. the system in claim 2, wherein said neutralization apparatus further comprises:

a pH value detector to detect the pH value of said second scrubbing solution and generate a pH value signal;

a second central processing device to receive said pH value signal and generate an instant third control signal; and at least one chemical agent tanks to receive said third control signal and provide said chemical agent to adjust said pH value of said second scrubbing solution.

* * * * *